United States Patent
Wang et al.

(10) Patent No.: US 12,196,910 B2
(45) Date of Patent: Jan. 14, 2025

(54) PARAMETERIZATION OF NUCLEAR MAGNETIC RESONANCE TRANSVERSE RELAXATION TIME DISTRIBUTION

(71) Applicant: SAUDI ARABIAN OIL COMPANY, Dhahran (SA)

(72) Inventors: Weihua Wang, Dhahran (SA); Yufeng Cui, Beijing (CN); Hasan Algheryafi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/000,499

(22) PCT Filed: Mar. 30, 2022

(86) PCT No.: PCT/CN2022/083991
§ 371 (c)(1),
(2) Date: Dec. 1, 2022

(87) PCT Pub. No.: WO2023/184214
PCT Pub. Date: Oct. 5, 2023

(65) Prior Publication Data
US 2024/0219601 A1   Jul. 4, 2024

(51) Int. Cl.
*G01V 3/32* (2006.01)
*E21B 49/02* (2006.01)
(Continued)

(52) U.S. Cl.
CPC .............. *G01V 3/32* (2013.01); *E21B 49/02* (2013.01); *G01N 15/088* (2013.01); *G01N 24/081* (2013.01)

(58) Field of Classification Search
CPC ........ G01V 3/32; E21B 49/02; G01N 15/088; G01N 24/081
See application file for complete search history.

(56) References Cited

U.S. PATENT DOCUMENTS 10,324,222 B2    6/2019 Chen et al.
2014/0320126 A1  10/2014 Heaton et al.

FOREIGN PATENT DOCUMENTS

CN    104819923 A    8/2015
CN    104932027 A    9/2015
(Continued)

OTHER PUBLICATIONS

Mardani et al. "NMR Facies Definition for carbonate Rocks Using Core/Log and Pore-Scale Measurement" (Year: 2019).*
(Continued)

*Primary Examiner* — G. M. A Hyder
(74) *Attorney, Agent, or Firm* — Osha Bergman Watanabe & Burton LLP (57) ABSTRACT

A system and method for performing a reservoir evaluation are disclosed. The method includes obtaining a nuclear magnetic resonance (NMR) dataset for a plurality of samples and obtaining an NMR log for a wellbore penetrating a reservoir. The method further includes determining a rock facies description for each sample, determining an NMR transverse relaxation time (NMR $T_2$) distribution from the NMR dataset, and determining a set of parameters characterizing the NMR $T_2$ distribution based on one or more predetermined parameters. The method still further includes identifying a plurality of NMR facies based, at least in part, on the set of parameters for each sample, determining a transformation that maps a subset of rock facies to a subset of the plurality of NMR facies, and performing the reservoir evaluation based, at least in part, on applying the transformation to the NMR log.

17 Claims, 10 Drawing Sheets

(51) Int. Cl.
  *G01N 15/08* (2006.01)
  *G01N 24/08* (2006.01)

(56) References Cited

FOREIGN PATENT DOCUMENTS

| CN | 105866009 A | 8/2016 |
|---|---|---|
| CN | 108291979 A | 7/2018 |
| CN | 109030311 A | 12/2018 |
| CN | 113622901 A | 11/2021 |

OTHER PUBLICATIONS

Behroozmand, A. A. et al. "A review of the principles and applications of the NMR technique for near-surface characterization" Surveys in geophysics, 36(1), 27-85; 2015 (59 pages).

Kenyon, W. E. "Petrophysical principles of applications of NMR logging" The Log Analyst, 38(02), 21-43; 1997 (23 pages).

Scikit Learn "Clustering" <https://scikit-learn.org/stable/modules/clustering.html>. Retrieved Nov. 11, 2020 (23 pages).

R. Salazar-Tio et al. "Monte Carlo Optimization-Inversion Methods for NMR" Petrophysics, vol. 51, No. 3; Jun. 2010 (11 pages).

P. Egermann et al. "Petrophysical Measurements From Drill Cuttings: An Added Value for the Reservoir Characterization Process" SPE Reservoir Evaluation & Engineering; Aug. 2006 (6 pages).

J. Yan, et al. "Sensitive parameters of NMR T2 spectrum and their application to pore structure characterization and evaluation in logging profile: A case study from Chang 7 in the Yanchang Formation, Heshui area, Ordos Basin, NW China" Marine and Petroleum Geology. vol. 111, Jan. 2020, pp. 230-239 (10 pages).

H. Xu "Nuclear Magnetic Resonance Logging T2 Spectrum Sensitive Parameter Extraction and Application Stufy-Take Ordos Basin Dense Sandstone" as example Chinese Master's Theses Full-text Database Basic Sciences Feb. 15, 2021, No. 03, ISSN: 1674-0246 A011-234, especially pp. 31-50 (107 pages).

International Search Report and Written Opinion issued in International Application No. PCT/CN2022/083991, mailed Dec. 28, 2022 (11 pages).

\* cited by examiner

| | Parameter Name | Description |
|---|---|---|
| 402a | T2_05 | T2 Value at 5% CML Curve |
| 402b | T2_15 | T2 Value at 15% CML Curve |
| 402c | T2_25 | T2 Value at 25% CML Curve |
| 402d | T2_35 | T2 Value at 35% CML Curve |
| 402e | T2_45 | T2 Value at 45% CML Curve |
| 402f | T2_50 | T2 Value at 50% CML Curve (Also Named "Medium Value") |
| 402g | T2_55 | T2 Value at 55% CML Curve |
| 402h | T2_65 | T2 Value at 65% CML Curve |
| 402i | T2_75 | T2 Value at 75% CML Curve |
| 402j | T2_85 | T2 Value at 85% CML Curve |
| 402k | T2_95 | T2 Value at 95% CML Curve |
| 402l | T2_gm05 | T2 Geometric Mean of 0% to 5% CML Curve |
| 402m | T2_gm15 | T2 Geometric Mean of 0% to 15% CML Curve |
| 402n | T2_gm25 | T2 Geometric Mean of 0% to 25% CML Curve |
| 402o | T2_gm75 | T2 Geometric Mean of 75% to 100% CML Curve |
| 402p | T2_gm85 | T2 Geometric Mean of 85% to 100% CML Curve |
| 402q | T2_gm95 | T2 Geometric Mean of 95% to 100% CML Curve |
| 402r | T2S | T2 Sorting |
| 402s | T2D | T2 Relative Sorting |
| 402t | T2sk | T2 Skewness |
| 402u | T2k | T2 Kurtosis |
| 402v | T2gm | T2 Geometric Mean |

PARAMETERIZATION OF NUCLEAR MAGNETIC RESONANCE TRANSVERSE RELAXATION TIME DISTRIBUTION

BACKGROUND

Nuclear magnetic resonance (NMR) is a tool used to determine characteristics of subsurface geological formations during the well logging process. NMR logs may measure porosity, permeability, and types of fluids present in the pore spaces of subsurface geological formations, which can be useful in identifying a presence of hydrocarbons. NMR transverse relaxation time ($T_2$) values are an output of an NMR log. NMR $T_2$ values represent loss of energy, or relaxation, of protons in the subsurface geological formation. The numerical distribution of the NMR $T_2$ values can be further used to identify a presence of hydrocarbons in subsurface geological formations. NMR $T_2$ data frequently require fitting parameters for use in evaluation of hydrocarbon reservoirs; consequently, direct optimization of NMR $T_2$ data without the use of fitting parameters is often desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of performing a reservoir evaluation. The method includes obtaining a nuclear magnetic resonance (NMR) dataset for a plurality of samples, and obtaining an NMR log for a wellbore penetrating a reservoir. The method further includes determining a rock facies description, determining an NMR transverse relaxation time (NMR $T_2$) distribution from the NMR dataset, and determining a set of parameters characterizing the NMR $T_2$ distribution based on one or more predetermined parameters, for each of the plurality of samples. The method still further includes identifying a plurality of NMR facies based, at least in part, on the set of parameters for each of the plurality of samples, determining a transformation that maps a subset of rock facies to a subset of the plurality of NMR facies, and performing the reservoir evaluation based, at least in part, on applying the transformation to the NMR log.

In general, in one aspect, embodiments relate to a non-transitory computer readable medium storing instructions executable by a computer processor. The instructions include functionality for receiving a nuclear magnetic resonance (NMR) dataset for a plurality of samples, and receiving an NMR log for a wellbore penetrating a reservoir. The instructions further include functionality determining a rock facies description, determining an NMR transverse relaxation time (NMR $T_2$) distribution from the NMR dataset, and determining a set of parameters characterizing the NMR $T_2$ distribution based on one or more predetermined parameters, for each of the plurality of samples. The instructions still further include functionality for identifying a plurality of NMR facies based, at least in part, on the set of parameters for each of the plurality of samples, determining a transformation that maps a subset of rock facies to a subset of the plurality of NMR facies, and performing a reservoir evaluation based, at least in part, on applying the transformation to the NMR log. The instructions still further include functionality for planning a wellbore trajectory based, at least in part, on the reservoir evaluation.

In general, in one aspect, embodiments relate to a logging system coupled to a nuclear magnetic resonance (NMR) logging tool, a computer processor, and a drilling system configured to drill a wellbore guided by the reservoir evaluation. The computer processor is configured to receive an NMR dataset for a plurality of samples, and receive an NMR log from the NMR logging tool for a wellbore. The computer processor is further configured to determine a rock facies description, determine an NMR transverse relaxation time (NMR $T_2$) distribution from the NMR dataset, and determine a set of parameters characterizing the NMR $T_2$ distribution based on one or more predetermined parameters, for each of the plurality of samples. The computer processor is further configured to identify a plurality of NMR facies based, at least in part, on the set of parameters for each of the plurality of samples, determine a transformation that maps a subset of rock facies to a subset of the plurality of NMR facies, and perform a reservoir evaluation based, at least in part, on applying the transformation to the NMR log. The drilling system is configured to plan a wellbore trajectory using a wellbore planning system based, at least in part, on the reservoir evaluation, and drill a wellbore based, at least in part, on the planned wellbore trajectory.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
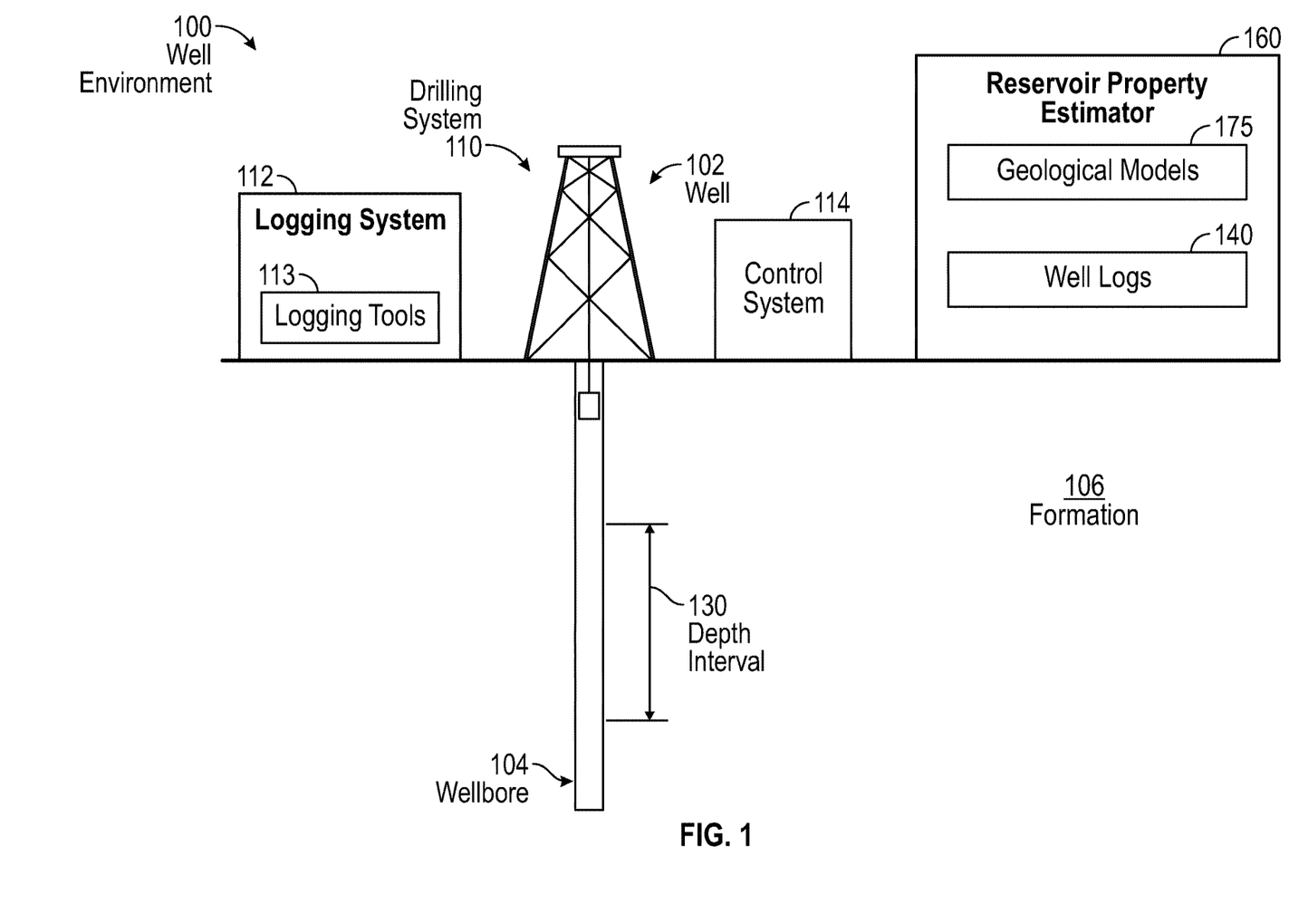
FIG. 1 depicts a well environment in accordance with one or more embodiments.

FIG. 1 depicts a well environment (100) in accordance with one or more embodiments, that may include a well (102) having a wellbore (104) extending into a formation (106). The wellbore (104) may include a bored hole that extends from the surface into a target zone of the formation (106), such as a reservoir (not shown). The formation (106) may possess various formation characteristics of interest, such as formation porosity, formation permeability, resistivity, and water saturation. Porosity may indicate how much void space exists in a particular rock within an area of interest in the formation (106), where oil, gas or water may be trapped. Permeability may indicate the ability of liquids and gases to flow through the rock within the area of interest. Resistivity may indicate how strongly rock or fluid within the formation (106) opposes the flow of electrical current. For example, resistivity may be relatively low for a formation that has high porosity and a large amount of water, and resistivity may be relatively high for a formation that has low porosity or includes a large amount of hydrocarbons. Water saturation may indicate the fraction of water in a given pore space.

In accordance with one or more embodiments, the well environment (100) may include a drilling system (110), a logging system (112), a control system (114), and a reservoir property estimator (160). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

In accordance with one or more embodiments, a reservoir property estimator (160) may include hardware and/or software with functionality for storing and analyzing well logs (140) and/or other types of data to generate and/or update one or more geological models (175). Geological models may include geochemical or geomechanical models that describe structural relationships within a particular geological region. While the reservoir property estimator (160) is shown at a well site, in some embodiments, the reservoir property estimator (160) may be remote from a well site. In some embodiments, the reservoir property estimator (160) is implemented as part of a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. In some embodiments, the control system (114), the logging system (112), and/or the reservoir property estimator (160) may include a computer system that is similar to the computer system (1002) described below with regard to FIG. 10 and the accompanying description.

The logging system (112) may include one or more logging tools (113), such as a nuclear magnetic resonance (NMR) logging tool or a resistivity logging tool, for use in generating well logs (140) of the formation (106). For example, a logging tool may be lowered into the wellbore (104) to acquire measurements as the tool traverses a depth interval (130) (for example, targeted reservoir section) of the wellbore (104). The plot of the logging measurements versus depth may be referred to as a "log" or "well log". Well logs (140) may provide depth measurements of the well (102) that describe such reservoir characteristics as formation porosity, formation permeability, resistivity, water saturation, and the like. The resulting logging measurements may be stored or processed or both, for example, by the control system (144), to generate corresponding well logs (140) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via logging operations (for example, wireline logging, logging-while-drilling (LWD) and measurement-while-drilling (MWD)). One example of a reservoir characteristic is the amount of oil present in the reservoir, and monitoring or observing the depletion of oil from the reservoir. Reservoir monitoring is an operation involving the mapping of fluid movements within the reservoir as a consequence of oil production.

In accordance with one or more embodiments, multiple types of logging techniques are available for determining various reservoir characteristics, and a particular form of logging may be selected and used based on the logging conditions and the type of desired measurements. NMR logging measures the induced magnetic moment of hydrogen nuclei (specifically, hydrogen protons) contained within the fluid-filled pore space of porous media (for example, reservoir rocks). Thus, NMR logs may measure the magnetic response of fluids present in the pore spaces of the reservoir rocks. In so doing, NMR logs may measure both porosity and permeability as well as the types of fluids present in the pore spaces. Furthermore, the logging system (112) may determine geological data for the well (102) by measuring corresponding well logs (140) for the well (102).

Turning to the reservoir simulator (160), the reservoir simulator (160) may include hardware or software with functionality for generating one or more trained models (170) regarding the formation (106). For example, the reservoir simulator (160) may store well logs (140) and further analyze the well log data, in addition to core sample data, seismic data, or other types of data to generate or update the one or more trained geological models (175) having a complex geological environment. For example, different types of models may be trained, such as artificial intelligence, convolutional neural networks, deep neural networks, support vector machines, decision trees, inductive learning models, deductive learning models, and supervised learning models, and are capable of approximating solutions of complex non-linear problems. The reservoir simulator (160) may couple to the logging system (112) and the drilling system (110).

In some embodiments, the reservoir simulator (160) is implemented in a software platform for the control system (114). The software platform may obtain data acquired by the drilling system (110) and logging system (112) as inputs, which may include multiple data types from multiple sources. The software platform may aggregate the data from these systems (110, 112) in real time for rapid analysis. Real-time of or relating to computer systems in the software platform is defined as the actual time for updating information with instantaneous processing at the same rate as required by a user or necessitated by a process being controlled. In some embodiments, the control system (114), the logging system (112), or the reservoir simulator (160) may include a computer system that is similar to the computer system (1000) described with regard to FIG. 10 and the accompanying description.

Figure 2:
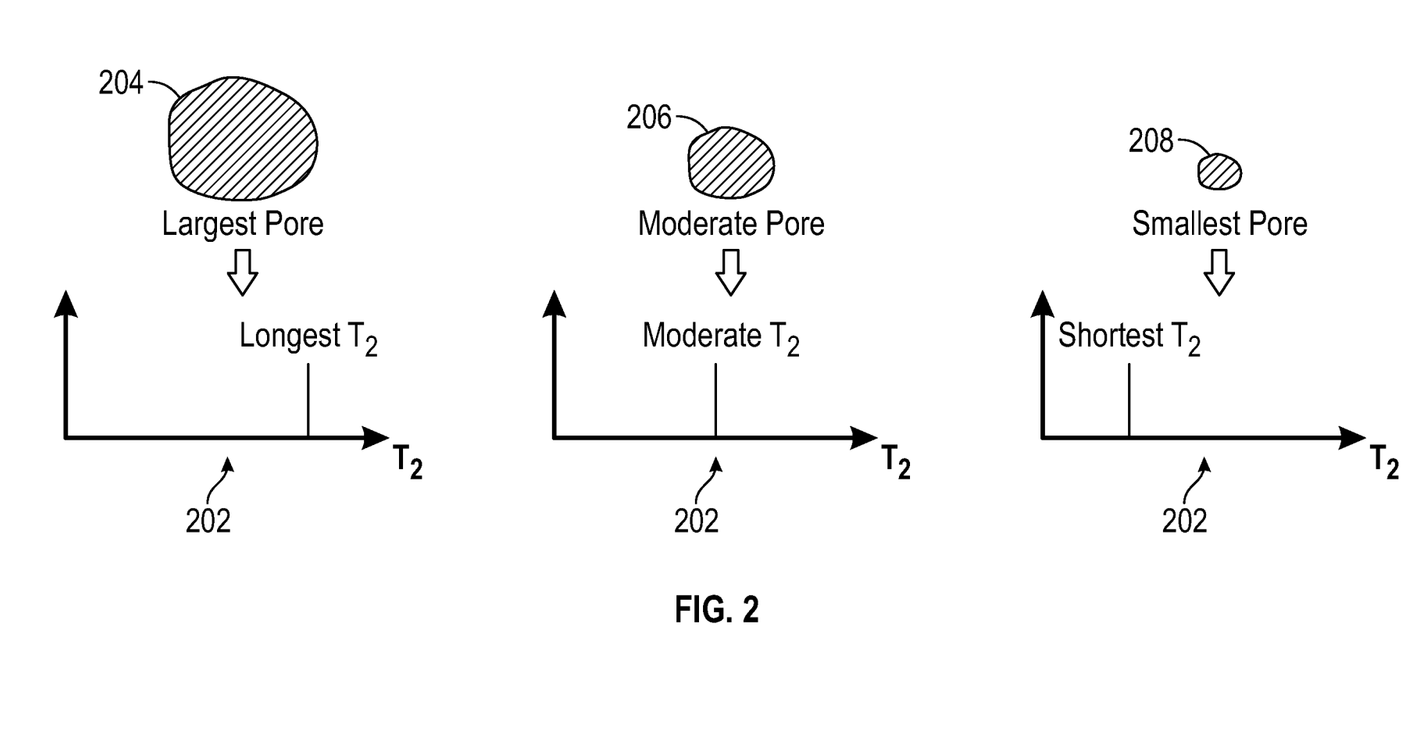
FIG. 2 depicts porosity versus NMR $T_2$ values in accordance with one or more embodiments.

FIG. 2 depicts the NMR $T_2$ values for pores of different sizes in accordance with one or more embodiments. Pores are void space within a rock that may contain oil, gas, or water. NMR measures the magnetic signal emitted by spinning protons (hydrogen nuclei) as they return to their original position after stimulation by a magnetic field and pulsed radio frequency energy. These signals are expressed as time constants related to magnetization decay, or loss of energy. When characterizing the nuclear magnetic properties of hydrogen in a formation (106), a basic log measurement may be the NMR $T_2$ distribution.

In FIG. 2, in accordance with one or more embodiments, the horizontal axis (202) represents NMR $T_2$ values, increasing in amplitude from left to right. Relative pore sizes are shown from largest pore (204), to moderate pore (206), to smallest pore (208). Pores in typical rocks have a distribution of varying sizes. Over the duration of NMR measurement, hydrogen nuclei (protons) collide with particle forming the surface of the rock pores. This interaction, known as surface relaxation, causes a reduction in the alignment of the protons at a rate characterize by the $T_2$ value. The greater the pore surface area per unit pore volume the more rapid the loss of alignment and the smaller the $T_2$ values. As an example, a spherical pore has a surface area to volume ratio of 3/R where R is the radius of the sphere, thus a small pore has a greater surface area to volume ratio and hence a smaller $T_2$ value than a large pore.

Figure 3:
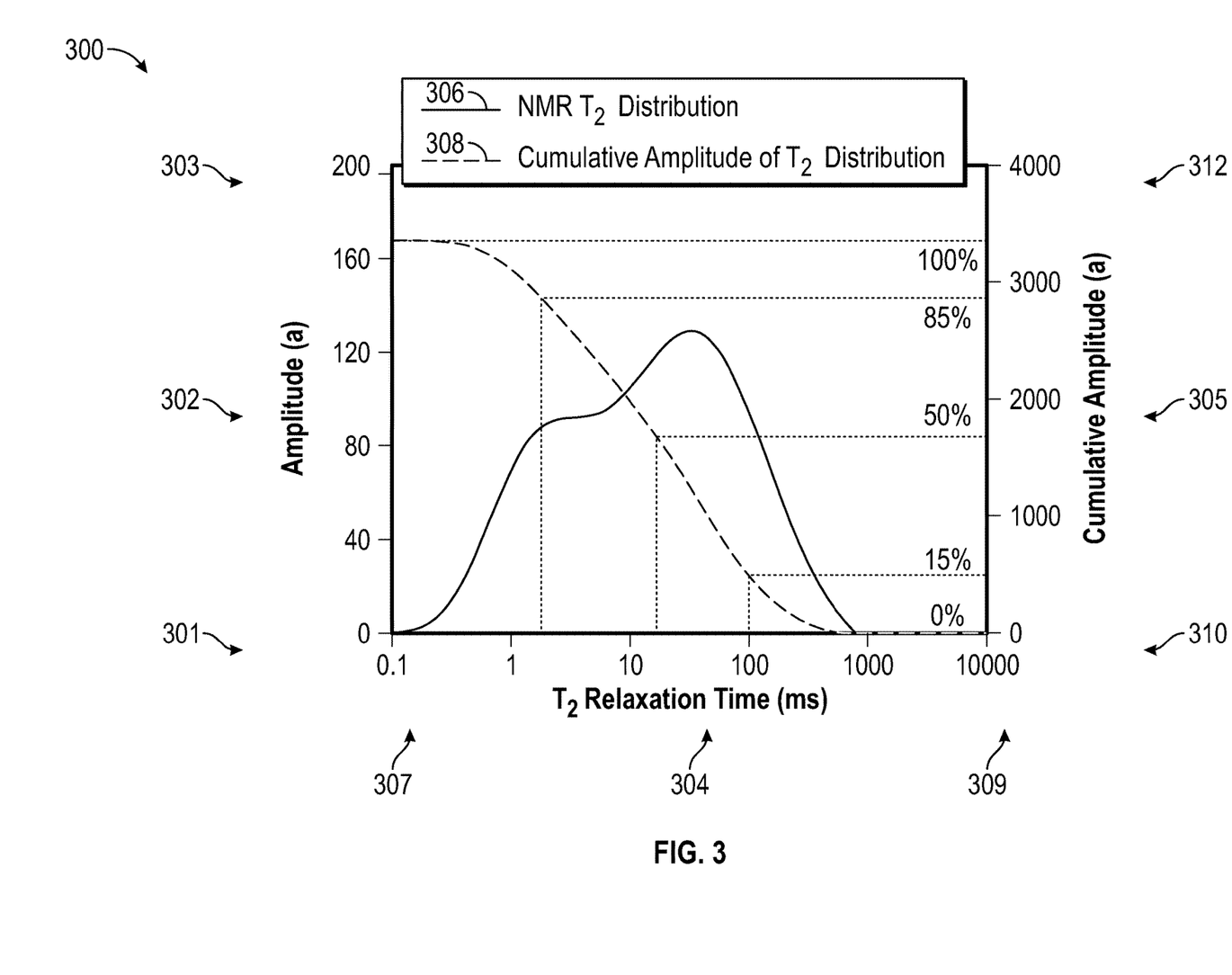
FIG. 3 shows an NMR $T_2$ distribution in accordance with one or more embodiments.

FIG. 3 shows an NMR $T_2$ distribution in accordance with one or more embodiments, presented as a distribution of NMR $T_2$ amplitudes versus time at a sample depth. The distribution of NMR $T_2$ values is an output of an NMR log. The NMR $T_2$ distribution may be further processed to give the total pore volume (the total porosity). The left vertical axis (302) indicates amplitude increasing from a minimum NMR $T_2$ amplitude (301) to a maximum NMR $T_2$ amplitude (303). The horizontal axis (304) indicates the NMR $T_2$ relaxation time, or time for loss of energy, or relaxation, by protons in in the formation (106), increasing from a minimum relaxation time (307) to a maximum relaxation time (309), measured in milliseconds (ms). The right vertical axis (305) indicates cumulative amplitude increasing from a minimum amplitude (310) to a maximum amplitude (312). The solid curve (306) represents the NMR $T_2$ distribution.

The dashed curve (308) represents the cumulative amplitude of the NMR $T_2$ distribution. The dotted horizontal lines represent NMR $T_2$ values at predetermined percentages of the maximum value of the cumulative curve of NMR $T_2$ amplitudes (308). These predetermined values are discussed in detail in FIG. 4 below.

Figure 4:
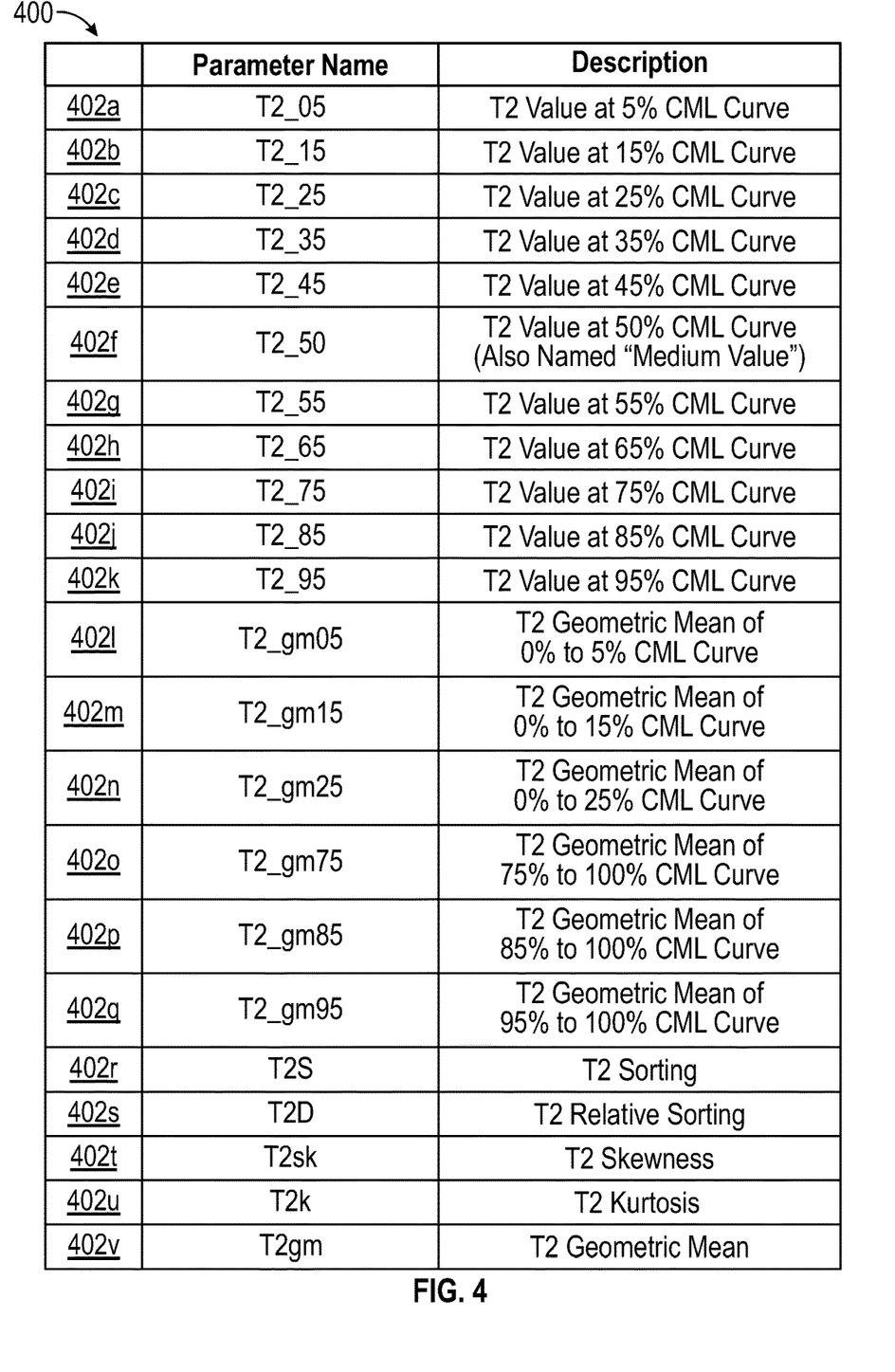
FIG. 4 shows parameters that quantitatively describe the NMR $T_2$ distribution in accordance with one or more embodiments.

FIG. 4 shows parameters that quantitatively describe the NMR $T_2$ distribution, in accordance with one or more embodiments. The 22 displayed parameters (402a-402v) may be extracted from the NMR $T_2$ distribution (306) and cumulative amplitude of the NMR $T_2$ distribution (308). Parameters 402a-402k represent NMR $T_2$ values at predetermined percentages of the cumulative curve of NMR $T_2$ amplitudes (308). Parameter 402v represents the geometric mean, or log-mean, of the NMR $T_2$ distribution (306). Parameters 402l-402q represent the geometric mean at a plurality of ranges of percentages of the cumulative curve of NMR $T_2$ amplitudes (308). Parameters 402a-402q represent logarithmic divisions of the NMR $T_2$ distribution (306), excepting the median value (402f), where each logarithmic division represents $1/10^{th}$ of the cumulative NMR $T_2$ distribution (308). Parameter 402r represents sorting of the NMR $T_2$ distribution (306), which may be calculated as:

$$T_{2S} = \sqrt{\sum_{i=1}^{n}(T_{2i} - T_{2gm})^2 \Delta A_i} \qquad \text{Equation (1)}$$

where $T_{2S}$ represents the sorting of the NMR $T_2$ distribution (306), n represents the cumulative NMR $T_2$ distribution (308) (in log scale) being equally divided by n points based on the amplitude of the NMR $T_2$ distribution (306), $T_{2i}$ represents the $i^{th}$ point value (NMR $T_2$ relaxation time), $\Delta A_i$ represents the amplitude difference between the $i^{th}$ point and the $(i+1)^{th}$ point, and $T_{2gm}$ represents the geometric mean, or log-mean, of the NMR $T_2$ distribution (306). In accordance with one or more embodiments, Parameter 402s represents relative sorting of the NMR $T_2$ distribution (306), which may be calculated as:

$$T_{2D} = \frac{T_{2S}}{T_{2gm}} \qquad \text{Equation (2)}$$

where $T_{2D}$ represents relative sorting of the NMR $T_2$ distribution (306), $T_{2S}$ represents the sorting of the NMR $T_2$ distribution (306), and $T_{2gm}$ represents the geometric mean, or log-mean, of the NMR $T_2$ distribution (306).

In accordance with one or more embodiments, Parameters 402t and 402u represents skewness and kurtosis of the NMR $T_2$ distribution, or the asymmetry of the NMR $T_2$ distribution about its geometric mean (402v). The values for Parameters 402t and 402u may be positive, negative, or zero, and may be calculated as:

$$T_{2sk} = \frac{1}{100} T_{2S}^{-3} \sum_{i=1}^{n}(T_{2i} - T_{2gm})^3 \Delta A_i \qquad \text{Equation (3)}$$

$$T_{2k} = \frac{1}{100} T_{2S}^{-4} \sum_{i=1}^{n}(T_{2i} - T_{2gm})^4 \Delta A_i \qquad \text{Equation (4)}$$

where $T_{2sk}$ represents skewness of the NMR $T_2$ distribution (306), where $T_{2k}$ represents kurtosis of the NMR $T_2$ distribution (306), $T_{2S}$ represents the sorting of the NMR $T_2$ distribution (306), n represents the cumulative NMR $T_2$ distribution (308) (in log scale) being equally divided by n points based on the amplitude of the NMR $T_2$ distribution (306), $T_{2i}$ represents the $i^{th}$ point value (NMR $T_2$ relaxation time), $\Delta A_i$ represents the amplitude difference between the $i^{th}$ point and the $(i+1)^{th}$ point, and $T_{2gm}$ represents the geometric mean, or log-mean, of the NMR $T_2$ distribution (306).

Figure 5:
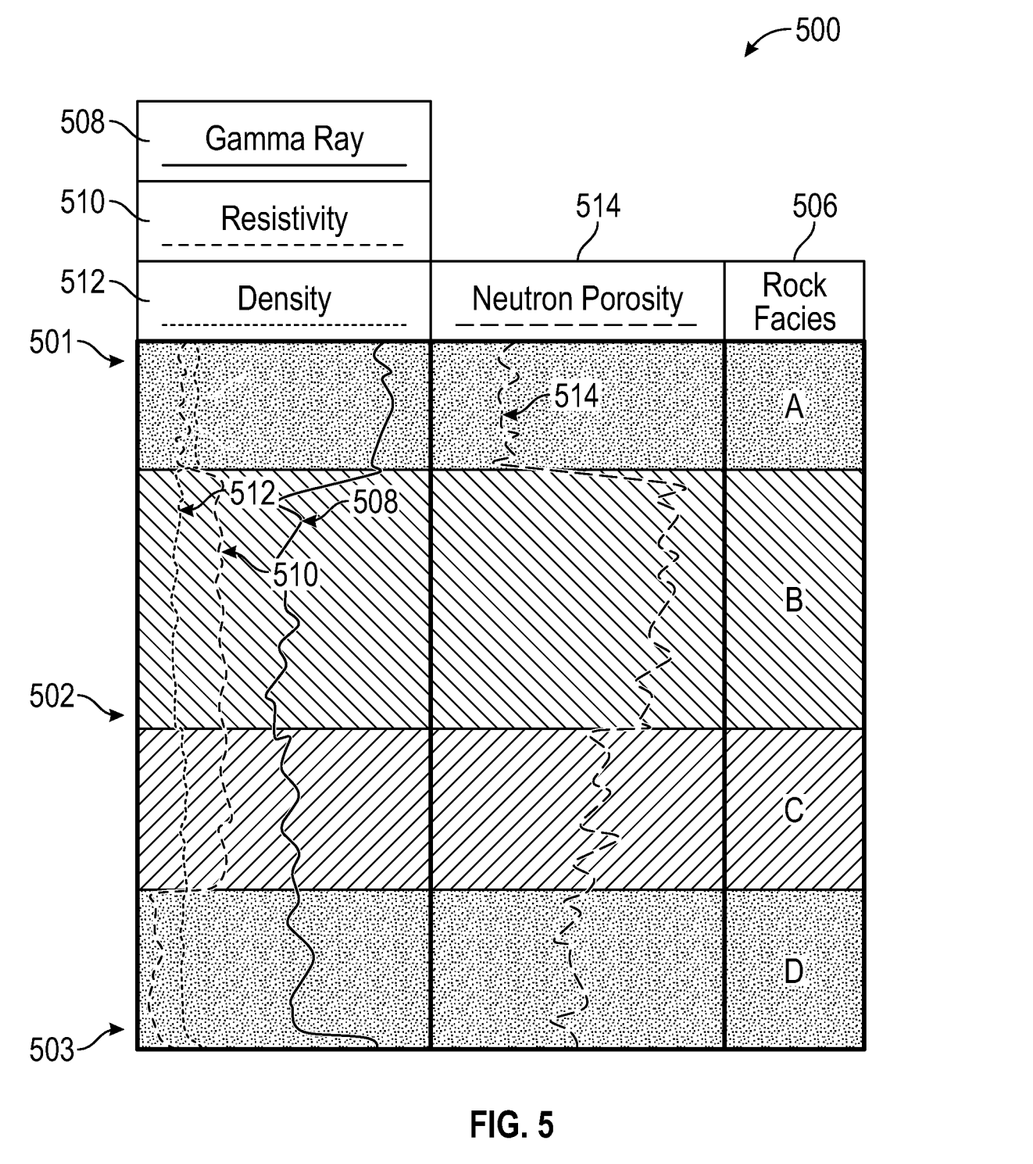
FIG. 5 shows rock facies determinations in accordance with one or more embodiments.

FIG. 5 shows rock facies determinations in accordance with one or more embodiments. FIG. 5 shows four well logs (504) along a portion of one wellbore (104). The depth interval (130) of the wellbore (104) is shown as increasing along the vertical axis (502) from a minimum depth (501) to a maximum depth (503). The well logs include a gamma ray log (508), a resistivity log (510), a density log (512), and a neutron porosity log (514). The combination of logs may indicate portions of rock facies A-D (510) as shown on a third track. The density log and neutron porosity log may indicate petrophysical properties, specifically porosity. For example, in FIG. 5, the density log and neutron porosity log may indicate rock facies B, C, and D are highly porous regions. Further rock facies B and rock facies C show high resistivity values and could be identified as potential hydrocarbon reservoirs.

Figure 6:
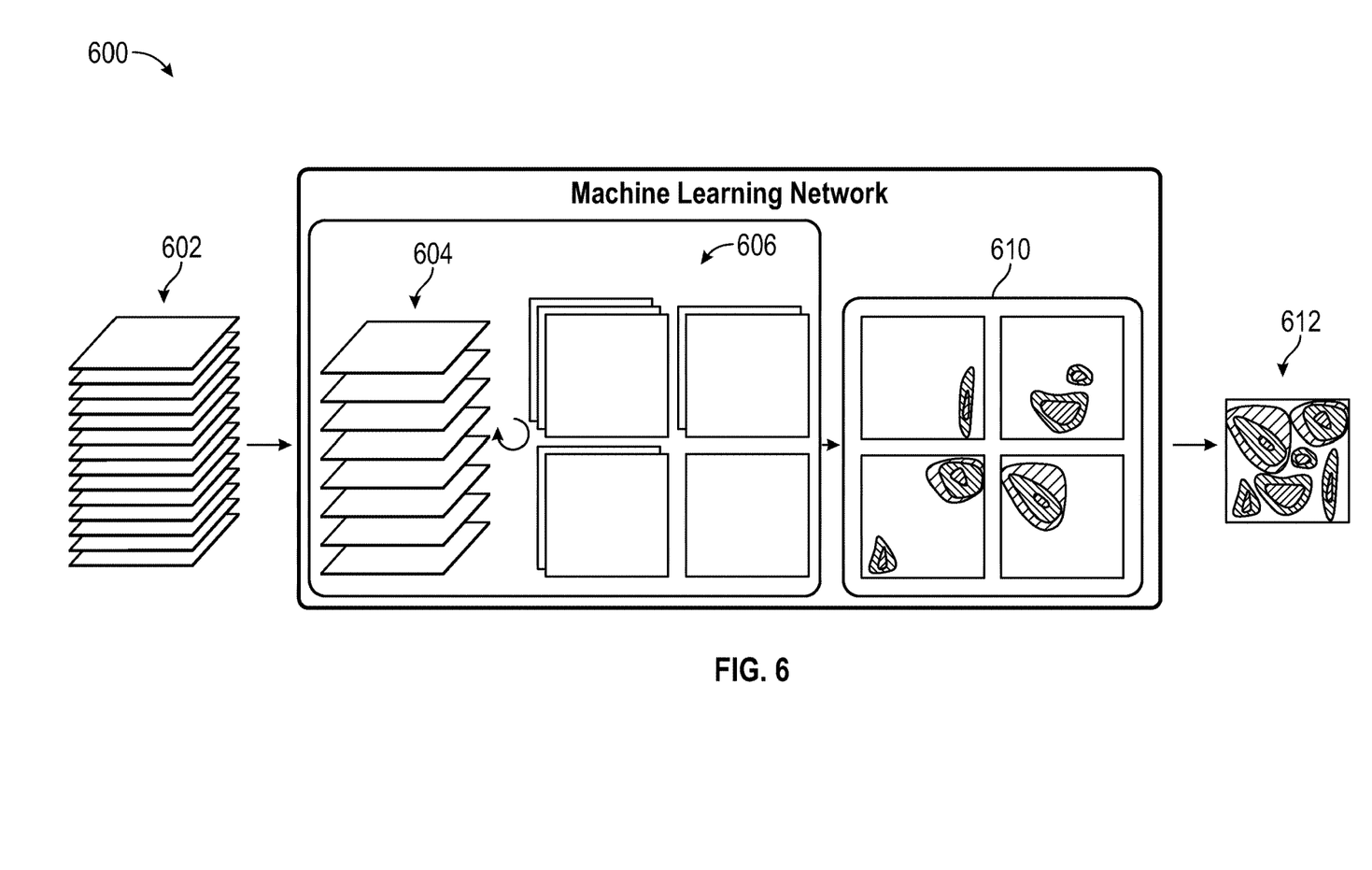
FIG. 6 depicts a machine learning network in accordance with one or more embodiments.

FIG. 6 depicts a machine learning network (600) that utilizes an unsupervised approach to categorize or cluster (606) a plurality of NMR facies (710) by unique attributes. Hereinafter, "categorize" and "cluster" are used synonymously and will be used interchangeably. Unsupervised approaches do not require categorical labels but instead utilize models that categorize information autonomously based on patterns within the inputs. As such, there is no predetermined quantity of categories in which the NMR facies (710) may be categorized into. In one embodiment, a machine learning network (600) categorizes a plurality of NMR facies (710) based, at least in part, value(s) of predetermined parameters used to characterize NMR $T_2$ distribution, which may include value(s) from 402a-402v. Elements of a machine learning method may include K-means models or Gaussian mixture models. K-means models are considered hard clustering models while Gaussian mixture models, such as variational Bayesian Gaussian mixture models, are considered soft clustering models. In some embodiments, hard clustering models may categorize a set of parameters for each NMR $T_2$ distribution (602) into only one category. In other embodiments, soft clustering models may categorize a set of parameters for each NMR $T_2$ distribution (602) into a plurality of categories and assign the probability of each set of parameters residing in a category. Following categorization (604) and reduction (606), the machine learning network (600) merges a set of parameters for each NMR $T_2$ distribution (602) within each category to create a plurality of NMR facies (610) where each NMR facies represents unique information relative to another NMR facies (610). The machine learning network (600) may assign a unique NMR facies (610) to each set of parameters for the NMR $T_2$ distributions (602). In one embodiment, the machine learning network (600) may merge the plurality of NMR facies (610) into one facies map (612).

In accordance with one or more embodiments, rock characteristics or rock facies are defined using specified characteristics that can be any observable characteristic of the rock and can be the changes that may occur in those characteristics over a subterranean region. Rock facies (from hereinafter also "facies") may include rock color, composition, texture, structure, fossil content, association, and form and may be chemical, physical, or biological in nature. Specifically, rock facies may include, without limitation, rock color, grain size and shape, mineral content, and rock type. Rock facies of one body of rock distinguish it from rock facies of another body of rock. Petrophysical properties of rock are defined as physical and chemical properties of rock and the interaction of rock with fluids. Petrophysical properties of rock may include, without limitation, porosity, permeability, and saturation.

Well logs (140) recorded using a well logging system (112) within a wellbore (104) may be used to identify rock facies and petrophysical properties surrounding a wellbore (104). Well logs (140) may be recorded using logging-while-drilling data, wireline data, and/or rock core data. Types of well logs (hereinafter also "logs") include, without limitation, gamma ray, spontaneous potential, resistivity, density, neutron porosity, photoelectricity, temperature, and acoustic information along the depth of a wellbore (104). Interpreted in combination log may be indicate facies and petrophysical properties. For example, regions of low a gamma ray values, high resistivity values, and high neutron porosity values may indicate a high porosity sandstone.

Figure 7:
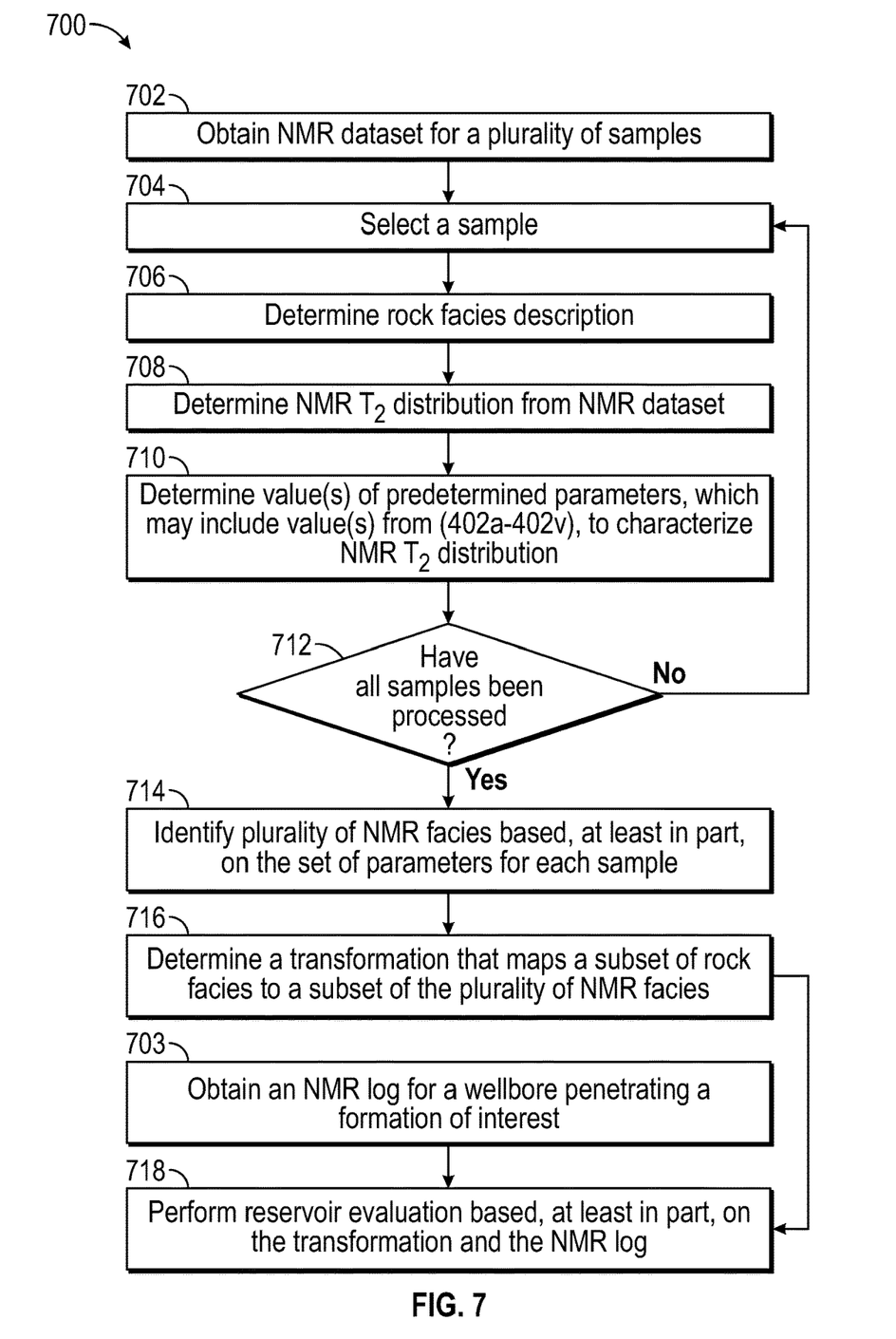
FIG. 7 shows a flowchart in accordance with one or more embodiments.

FIG. 7 shows a flowchart in accordance with one or more embodiments. In Step 702, an NMR dataset is obtained. The NMR dataset may include NMR data for a plurality of depth samples recorded by an NMR well logging tool, or it may include NMR measurements made on a plurality of core samples in a laboratory, or both. The well logging measurements and the core samples may come from multiple depths within as single well or from a plurality of wells.

In Step 704, a current sample from the plurality of samples is selected. In accordance with one or more embodiments, the current sample may be the first sample in a series of samples that may be examined sequentially or may be one of a plurality of samples that are examined simultaneously.

In Step 706, a rock facies description for the current sample may be determined. The rock facies description may be based on one or more well logs (140) such as a gamma ray, resistivity, density, and/or neutron porosity logs. Alternatively, the rock facies may be determined from core samples based upon chemical analysis and optical examination including thin section optical microscopy.

In Step 708, an NMR $T_2$ distribution (306) may be determined for the sample. The NMR $T_2$ distribution characterizes relaxation times of the protons in a formation (106) at the depth of the sample.

In Step 710, a value of one or more predetermined parameters may be determined. In accordance with some embodiments, the parameters may be selected from parameters 402a-402v, that may characterize the shape of the NMR $T_2$ distribution (306). In accordance with other embodiments, the shape of the NMR $T_2$ distribution (306) may be characterized by any other parameter that may be familiar to a person of ordinary skill in the art without departing from the scope of the invention.

In Step 712, if all samples have been processed using Step 704 through Step 710, the workflow continues to Step 714. Alternatively, in Step 712, if all samples have not yet been processed via Step 704-Step 710, the workflow returns to Step 704 to select a new current sample and repeat Step 706 through Step 710 for the new current sample.

In Step 714, in accordance with one or more embodiments, a plurality of NMR facies may be identified based, at least in part, on the set of parameters for all the samples. The plurality of NMR facies may be determined using a machine learning network. For example, the plurality of NMR facies may be determined using an unsupervised clustering method.

In Step 716, a transformation is determined to map a subset of rock facies to a subset of the plurality of NMR facies. The plurality of NMR facies may be labelled by numbers, such as roman numerals. For example, a sample whose rock facies is determined to be as sandstone via analysis of rock cores and/or well logs and having a high porosity and a high permeability may be designated as having an NMR facies IV.

In Step 703, an NMR log for a wellbore (104) penetrating a formation (106) of interest is obtained. The NMR log may be measured using an NMR well logging tool and a plurality of NMR $T_2$ distributions may be determined for a plurality of positions or depths along the wellbore.

Step 718 performs a reservoir evaluation based, at least in part, on the transformation obtained in Step 716, applied to the NMR log penetrating a formation of interest of Step 703. The transformation determined in Step 716, mapping rock facies to corresponding NMR facies, may be applied to the NMR NMR $T_2$ distributions for the wellbore (104) penetrating a formation (106) of interest to provide a rock facies evaluation for each depth sample.

Figure 8:
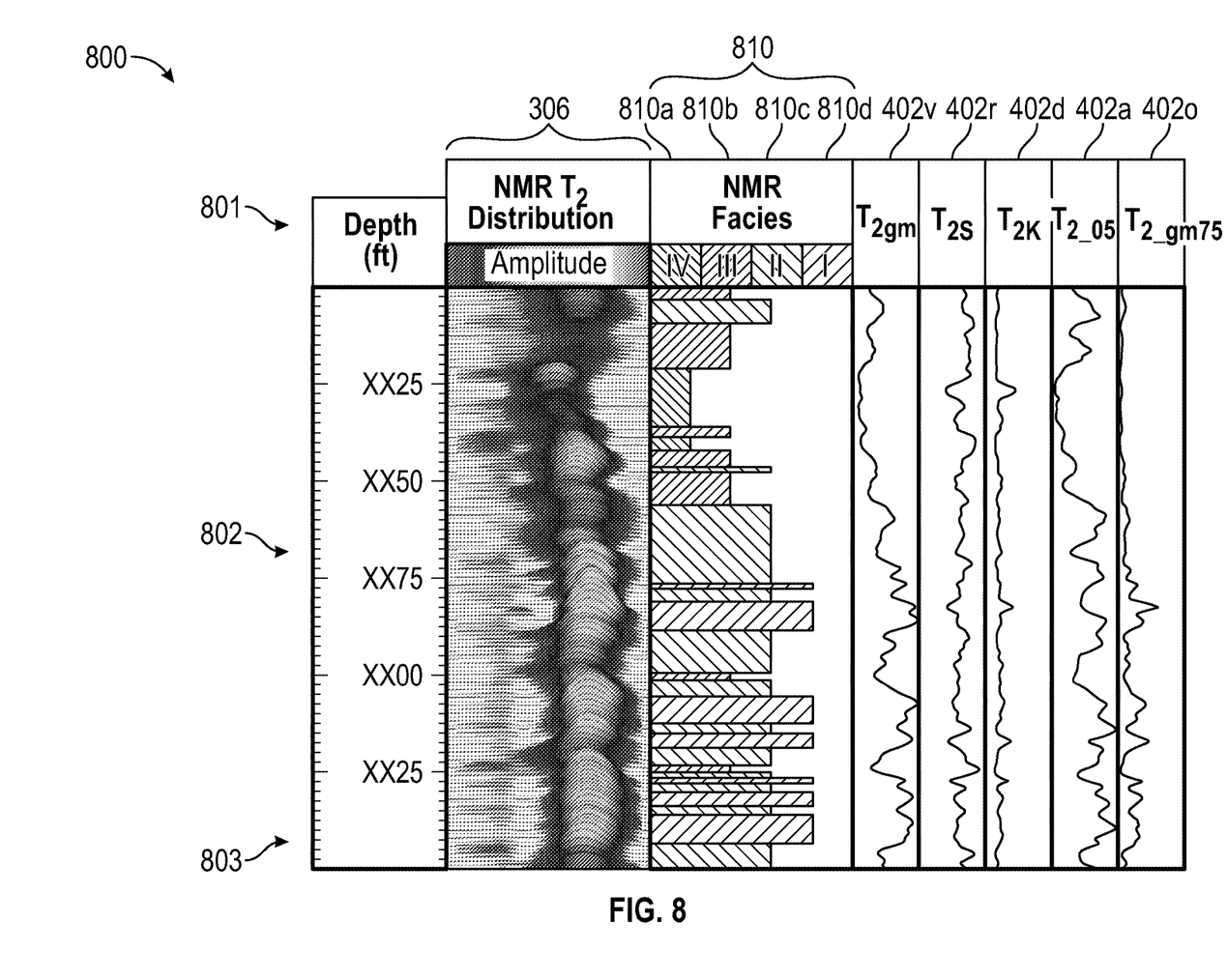
FIG. 8 shows NMR facies determinations in accordance with one or more embodiments.

FIG. 8 shows NMR facies determinations in accordance with one or more embodiments. A depth interval (130) of the wellbore (104) is shown, with depth increasing along the vertical axis (802) from a minimum depth (801) to a maximum depth (803). The NMR $T_2$ time is represented on the horizontal axis. NMR facies (810), are shown adjacent to the NMR $T_2$ distributions. NMR facies (810) are designated as Type IV (810a), Type III (810b), Type II (810c), and Type I (810d). The NMR facies (810a-810d) may be obtained by utilizing clustering algorithms, which is further addressed in FIG. 8. The NMR facies (810a-810d) are characterized by patterns of NMR $T_2$ distribution (306). NMR logs measure both porosity and permeability as well as the types of fluids present in the pore spaces. Thus, the value(s) of predetermined parameters extracted from the NMR $T_2$ distribution (402a-402v) may be used to characterize the NMR $T_2$ distribution (306). The NMR facies (810) may be subsequently mapped to a rock facies, and further utilized for reservoir evaluation in terms of porosity and permeability. A presence of high porosity and permeability values may be considered as advantageous for potential hydrocarbon reservoirs.

In accordance with one or more embodiments, Type I (810d) may be designated as having the highest reservoir quality in terms of reservoir evaluation, having highest porosity values and permeability values. Type IV (810a) may be designated as having the poorest reservoir quality as a result of reservoir evaluation, having lowest porosity values and permeability values. Type II (810c) and Type III (810b) may be designated as having intermediate porosity values and permeability values, which are higher than Type IV (810a) and lower than Type I (810d).

In accordance with one or more embodiments, several parameters (402v, 402r, 402d, 402a, 402o) extracted from the NMR $T_2$ distribution (306) and cumulative amplitude of the NMR $T_2$ distribution (308) are shown for demonstration. The parameters (402v, 402r, 402d, 402a, 402o) were extracted from the NMR $T_2$ distribution (306) and cumulative amplitude of the NMR $T_2$ distribution (308) and used to delineate the NMR facies (810).

In accordance with one or more embodiments, a drilling target may be determined based upon the reservoir evaluation. In particular, one or more zones of high porosity and permeability may be targeted based on the rock facies determined from NMR measurements. Further, a wellbore path may be planned to target these zones. For example, favorable rock facies determined using the workflow described in FIG. 7 may be further targeted with additional wells drilled from the surface or extending off from a location within an already drilled wellbore (106), such as the wellbore (106) in which the NMR dataset was recorded. Such well, referred to a "side-track" wells or "side-tracks" may target the portions of the formation determined to have favorable characteristics such as high permeability.

Furthermore, a wellbore planning system may be used to plan the wellbore trajectory, including the orientation and changes in diameter of the wellbore (106) along the trajectory and the angle of incidence at which the wellbore enters the target zone. The wellbore planning system may include a computer processor with hardware appropriate software to plan an optimized wellbore trajectory. The wellbore planning system may take as inputs such factors such as the available surface well locations or kick-off points, drilling target point coordinates, the maximum permissible curvature ("dog-leg, or "build-rate"), and geological and geomechanical constraints. The wellbore planning system may further incorporate limitations such as maximum torque and drag, and the mechanical strength of the drill string, casing, bottomhole assemblies, logging tools and completion strings.

Figure 9:
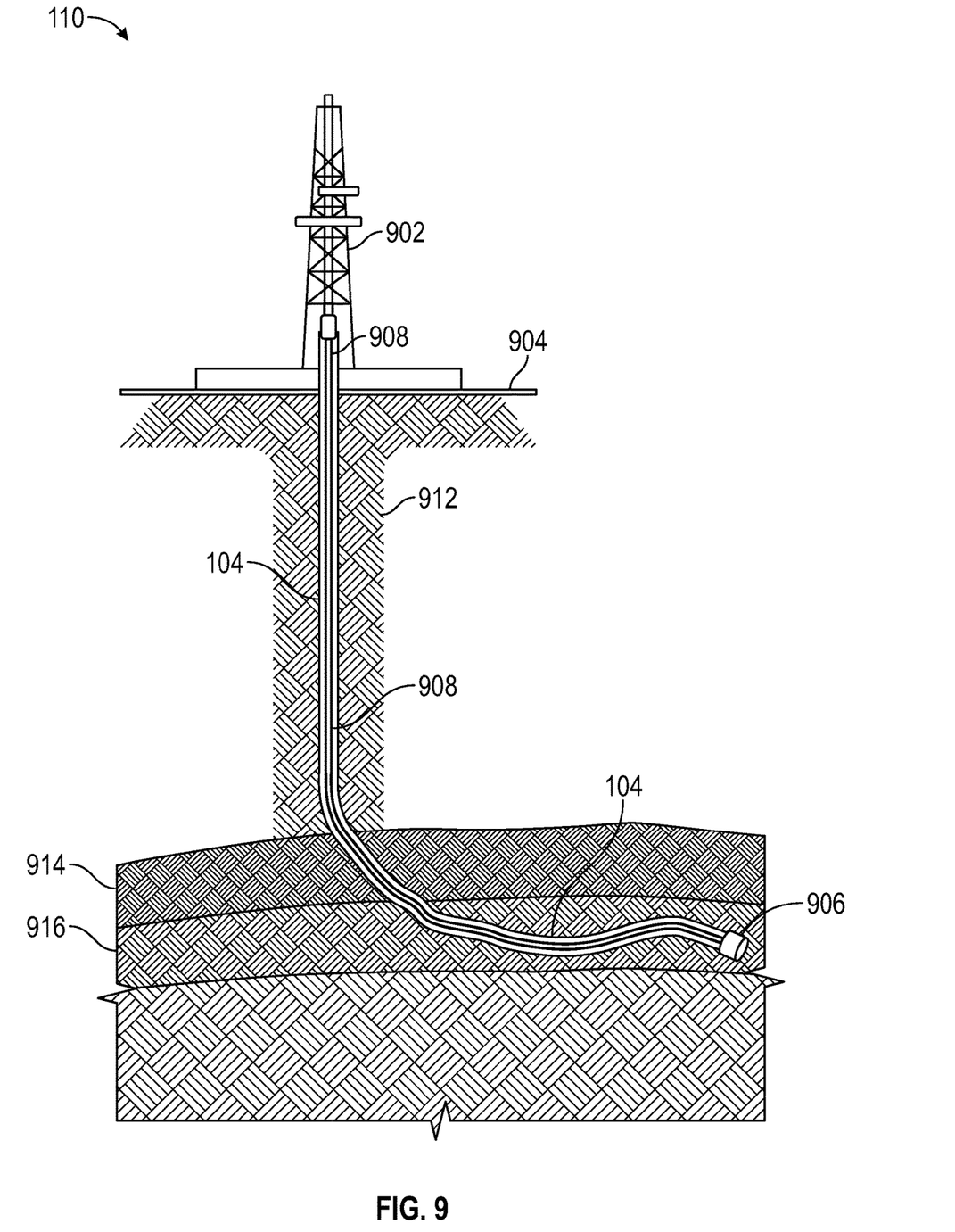
FIG. 9 depicts a drilling system in accordance with one or more embodiments.

FIG. 9 shows a drilling system (110) in accordance with one or more embodiments. The drilling system may drill a wellbore along the wellbore trajectory determined using the wellbore planning system. The drilling system (110) may include a derrick (902). In some embodiments, the derrick (902) may be located on the land surface (904). In other embodiments, the derrick may be located on a jack-up drill rig (not shown), or a floating drill rig (not shown), on a drill ship (not shown). A drill bit (906) suspended by a drill string (906) from the derrick (902) may drill a wellbore (104) through the subsurface. In accordance with one or more embodiments, the wellbore may be vertical, highly deviated or horizontal. The wellbore (104) may traverse a plurality of overburden layers (912) and one or more cap-rock layers (914). The wellbore (104) may penetrate one or more hydrocarbon reservoirs (916).

In other embodiments, completion decisions such as where and how to hydraulic fracture the formation or where to acidize the formation to enhance production may be made based, at least in part, on the reservoir evaluation obtained using the workflow described in FIG. 7. In still further embodiments, surface production facilities such as pipelines and gas-oil separation plants may be determined based upon the rock facies determination made using the workflow described in FIG. 7.

Figure 10:
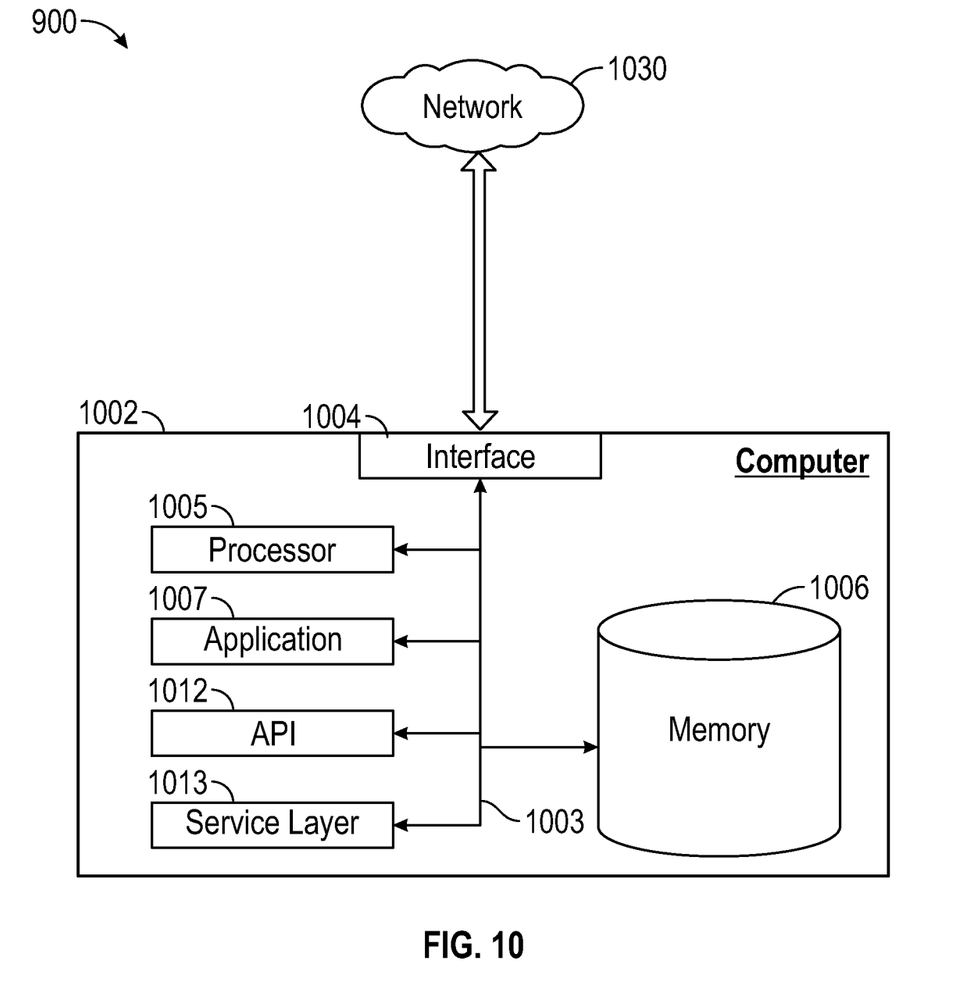
FIG. 10 depicts a computer system in accordance with one or more embodiments.

FIG. 10 further depicts a block diagram of the computer system (1002) used to provide computational functionalities associated with described algorithms, methods, functions, processes, flows, and procedures as described in this disclosure, according to one or more embodiments. The illustrated computer (1002) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1002) may include a computer that includes an input device, such as a keypad, keyboard, touch screen, or other device that can accept user information, and an output device that conveys information associated with the operation of the computer (1002), including digital data, visual, or audio information (or a combination of information), or a Graphical User Interface (GUI).

The computer (1002) can serve in a role as a client, network component, a server, a database or other persistency, or any other component (or a combination of roles) of a computer system for performing the subject matter described in the instant disclosure. The illustrated computer (1002) is communicably coupled with a network (1030). In some implementations, one or more components of the computer (1002) may be configured to operate within environments, including cloud-computing-based, local, global, or other environment (or a combination of environments).

At a high level, the computer (1002) is an electronic computing device operable to receive, transmit, process, store, or manage data and information associated with the described subject matter. According to some implementations, the computer (1002) may also include or be communicably coupled with an application server, e-mail server, web server, caching server, streaming data server, business intelligence (BI) server, or other server (or a combination of servers).

The computer (1002) can receive requests over network (1030) from a client application (for example, executing on another computer (1002) and responding to the received requests by processing the said requests in an appropriate software application. In addition, requests may also be sent to the computer (1002) from internal users (for example, from a command console or by other appropriate access method), external or third-parties, other automated applications, as well as any other appropriate entities, individuals, systems, or computers.

Each of the components of the computer (1002) can communicate using a system bus (1003). In some implementations, any or all of the components of the computer (1002), both hardware or software (or a combination of hardware and software), may interface with each other or the interface (1004) (or a combination of both) over the system bus (1003) using an application programming interface (API) (1012) or a service layer (1013) (or a combination of the API (1012) and service layer (1013). The API (1012) may include specifications for routines, data structures, and object classes. The API (1012) may be either computer-language independent or dependent and refer to a complete interface, a single function, or even a set of APIs. The service layer (1013) provides software services to the computer (1002) or other components (whether or not illustrated) that are communicably coupled to the computer (1002). The functionality of the computer (1002) may be accessible for all service consumers using this service layer. Software services, such as those provided by the service layer (1013), provide reusable, defined business functionalities through a defined interface. For example, the interface may be software written in JAVA, C++, or other suitable language providing data in extensible markup language (XML) format or another suitable format. While illustrated as an integrated component of the computer (1002), alternative implementations may illustrate the API (1012) or the service layer (1013) as stand-alone components in relation to other components of the computer (1002) or other components (whether or not illustrated) that are communicably coupled to the computer (1002). Moreover, any or all parts of the API (1012) or the service layer (1013) may be implemented as child or sub-modules of another software module, enterprise application, or hardware module without departing from the scope of this disclosure.

The computer (1002) includes an interface (1004). Although illustrated as a single interface (1004) in FIG. 10, two or more interfaces (1004) may be used according to particular needs, desires, or particular implementations of the computer (1002). The interface (1004) is used by the computer (1002) for communicating with other systems in a distributed environment that are connected to the network (1030). Generally, the interface (1004) includes logic encoded in software or hardware (or a combination of software and hardware) and operable to communicate with the network (1030). More specifically, the interface (1004) may include software supporting one or more communication protocols associated with communications such that the network (1030) or interface's hardware is operable to communicate physical signals within and outside of the illustrated computer (1002).

The computer (1002) includes at least one computer processor (1005). Although illustrated as a single computer processor (1005) in FIG. 10, two or more processors may be used according to particular needs, desires, or particular implementations of the computer (1002). Generally, the computer processor (1005) executes instructions and manipulates data to perform the operations of the computer (1002) and any algorithms, methods, functions, processes, flows, and procedures as described in the instant disclosure.

The computer (1002) also includes a memory (1006) that holds data for the computer (1002) or other components (or a combination of both) that can be connected to the network (1030). For example, memory (1006) can be a database storing data consistent with this disclosure. Although illustrated as a single memory (1006) in FIG. 10, two or more memories may be used according to particular needs, desires, or particular implementations of the computer (1002) and the described functionality. While memory (1006) is illustrated as an integral component of the computer (1002), in alternative implementations, memory (1006) can be external to the computer (1002).

The application (1007) is an algorithmic software engine providing functionality according to particular needs, desires, or particular implementations of the computer (1002), particularly with respect to functionality described in this disclosure. For example, application (1007) can serve as one or more components, modules, applications, etc. Further, although illustrated as a single application (1007), the application (1007) may be implemented as multiple applications (1007) on the computer (1002). In addition, although illustrated as integral to the computer (1002), in alternative implementations, the application (1007) can be external to the computer (1002).

There may be any number of computers (1002) associated with, or external to, a computer system containing computer (1002), wherein each computer (1002) communicates over network (1030). Further, the term "client," "user," and other appropriate terminology may be used interchangeably as appropriate without departing from the scope of this disclosure. Moreover, this disclosure contemplates that many users may use one computer (1002), or that one user may use multiple computers (1002).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A method of performing a reservoir evaluation, comprising:
   obtaining a nuclear magnetic resonance (NMR) dataset for a plurality of samples;
   obtaining an NMR log for a wellbore penetrating a reservoir;
   for each of the plurality of samples:
      determining a rock facies description,
      determining an NMR transverse relaxation time (NMR $T_2$) distribution from the NMR dataset, and
      determining a value of one or more predetermined parameters characterizing the NMR $T_2$ distribution,
      wherein the predetermined parameters are selected from a group consisting of geometric mean, kurtosis, skewness, sorting, relative sorting, and a cumulative value at percentage points on a cumulative curve of amplitude, and
   identifying a plurality of NMR facies based, at least in part, on the one or more predetermined parameters for each of the plurality of samples;
   determining a transformation that maps a subset of rock facies to a subset of the plurality of NMR facies, and
   performing the reservoir evaluation based, at least in part, on applying the transformation to the NMR log.

2. The method of claim 1, further comprising planning a wellbore trajectory using a wellbore planning system based, at least in part, on the reservoir evaluation.

3. The method of claim 2, further comprising drilling a wellbore based, at least in part, on the planned wellbore trajectory using a drilling system.

4. The method of claim 1, wherein the plurality of samples comprises rock core samples from a plurality of depths.

5. The method of claim 1, wherein determining the rock facies description comprises acquiring at least one measurement from the sample, wherein at least one measurement is at least one of gamma ray, neutron porosity, electrical resistivity, and density.

6. The method of claim 1, wherein identifying the plurality of NMR facies comprises use of an unsupervised clustering method.

7. The method of claim 1, wherein applying the transformation comprises:
   calculating an NMR $T_2$ distribution of the NMR log;
   determining an NMR facies from the NMR $T_2$ distribution of the NMR log; and
   identifying the rock facies based, at least in part, on the NMR facies and the transformation.

8. A non-transitory computer readable medium storing instructions executable by a computer processor, the instructions comprising functionality for:
   receiving a nuclear magnetic resonance (NMR) dataset for a plurality of samples;
   receiving an NMR log for a wellbore penetrating a reservoir;
   for each of the plurality of samples:
      determining a rock facies description,
      determining an NMR transverse relaxation time (NMR $T_2$) distribution from the NMR dataset, and
      determining a value of one or more predetermined parameters set of parameters characterizing the NMR $T_2$ distribution,
      wherein the predetermined parameters are selected from a group consisting of geometric mean, kurtosis, skewness, sorting, relative sorting, and a cumulative value at percentage points on a cumulative curve of amplitude, and
   identifying a plurality of NMR facies based, at least in part, on the one or more predetermined parameters for each of the plurality of samples;
   determining a transformation that maps a subset of rock facies to a subset of the plurality of NMR facies, and
   performing a reservoir evaluation based, at least in part, on applying the transformation to the NMR log, and
   planning a wellbore trajectory based, at least in part, on the reservoir evaluation.

9. The non-transitory computer readable medium of claim 8, wherein the plurality of samples comprises rock core samples from a plurality of depths.

10. The non-transitory computer readable medium of claim 8, wherein determining the rock facies description comprises acquiring at least one measurement from the sample, wherein at least one measurement is at least one of gamma ray, neutron porosity, electrical resistivity, and density.

11. The non-transitory computer readable medium of claim 8, wherein identifying the plurality of NMR facies comprises use of an unsupervised clustering method.

12. The non-transitory computer readable medium of claim 8, wherein applying the transformation comprises:
   calculating the NMR $T_2$ distribution from the NMR log;
   determining an NMR facies from the NMR $T_2$ distribution; and
   identifying the rock facies based, at least in part, on the NMR facies and the transformation.

13. A system comprising:
   a logging system coupled to a nuclear magnetic resonance (NMR) logging tool;
   a computer processor, configured to:
      receive an NMR dataset for a plurality of samples;
      receive an NMR log from the NMR logging tool for a wellbore;
      for each of the plurality of samples:
         determine a rock facies description;
         determine an NMR transverse relaxation time (NMR $T_2$) distribution from the NMR dataset; and
         determining a value of one or more predetermined parameters characterizing the NMR $T_2$ distribution,
         wherein the predetermined parameters are selected from a group consisting of geometric mean, kurtosis, skewness, sorting, relative sorting, and a cumulative value at percentage points on a cumulative curve of amplitude, and
      identify a plurality of NMR facies based, at least in part, on the one or more predetermined parameters for each of the plurality of samples,
      determine a transformation that maps a subset of rock facies to a subset of the plurality of NMR facies, and
      perform a reservoir evaluation based, at least in part, on applying the transformation to the NMR log; and
   a drilling system configured to:
      plan a wellbore trajectory using a wellbore planning system based, at least in part, on the reservoir evaluation, and
      drill a wellbore based, at least in part, on the planned wellbore trajectory.

14. The system of claim 13, wherein the plurality of samples comprises rock core samples from a plurality of depths.

15. The system of claim 13, wherein determining the rock facies description comprises acquiring at least one measurement from the sample, wherein at least one measurement is at least one gamma ray, neutron porosity, electrical resistivity, and density, or laboratory analysis of rock cores, to determine a rock facies description.

16. The system of claim 13, wherein identifying the plurality of NMR facies comprises use of an unsupervised clustering method.

17. The system of claim 13, wherein applying the transformation comprises:
- calculating the NMR $T_2$ distribution from the NMR log;
- determining an NMR facies from the NMR $T_2$ distribution; and
- identifying the rock facies based, at least in part, on the NMR facies and the transformation.

* * * * *